United States Patent
Scandurra et al.

(10) Patent No.: US 8,401,404 B2
(45) Date of Patent: Mar. 19, 2013

(54) OPTICAL RECEIVER

(75) Inventors: Alberto Scandurra, Messina (IT); Giuseppe Guarnaccia, Catania (IT); Salvatore Pisasale, Catania (IT); Fabio Zito, Villa S. Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 369 days.

(21) Appl. No.: 12/790,659

(22) Filed: May 28, 2010

(65) Prior Publication Data

US 2010/0322638 A1 Dec. 23, 2010

(30) Foreign Application Priority Data

Jun. 22, 2009 (IT) .............. TO2009A0472
Jun. 22, 2009 (IT) .............. TO2009A0473

(51) Int. Cl.
*H04B 10/06* (2006.01)
(52) U.S. Cl. ..................... 398/208; 398/202
(58) Field of Classification Search ............. 398/79–97, 398/202–214
See application file for complete search history.

(56) References Cited

U.S. PATENT DOCUMENTS

| | | | |
|---|---|---|---|
| 7,352,301 B2 | 4/2008 | Pappalardo et al. | |
| 2004/0228629 A1 | 11/2004 | Harris et al. | |
| 2007/0172235 A1 | 7/2007 | Snider et al. | |
| 2008/0084862 A1* | 4/2008 | Oliver | 370/350 |
| 2008/0205889 A1 | 8/2008 | Aoki | |

FOREIGN PATENT DOCUMENTS

| | | |
|---|---|---|
| EP | 1 445 975 A2 | 11/2004 |
| EP | 1 524 810 A1 | 4/2005 |
| EP | 1 806 878 A1 | 7/2007 |

OTHER PUBLICATIONS

U.S. Appl. No. 12/790,662, filed May 28, 2010, 28 pages.
Chao et al., "An Optical Interconnection Network for Terabit IP Routers," Journal of Lightwave Technology, 18 (12):2095-2112, Dec. 2000.
Das et al., "QoS Performance of OBS in WDM/TDM Networks," Proceedings of the IEEE International Conference on Wireless and Optical Communications Networks, Piscataway, New Jersey, Apr. 28, 2009, pp. 1-5.
Matsuura et al., "Packet-by-packet wavelength-routing interconnect technique for 5 Tbit/s switching system," Electronics Letters, 38(2), Jan. 17, 2002, 2 pages.
Wu et al., "Architecture for Two-way Data Services Over Residential Area CATV Networks," Proceedings of the Sixteenth Annual Joint Conference of the IEEE Computer and Communications Societies: Driving the Information Revolution, Kobe, Japan, Apr. 7-11, 1997, vol. 3, pp. 1157-1164.
Wydrowski et al., "QoS in Best-Effort Networks," IEEE Communications Magazine, pp. 44-49, Dec. 2002.
Yamakoshi et al., "5-Tb/s Frame-based ATM Switching System using 2.5-Gb/s×8-λ Optical Switching Technique," IEEE Workshop on High Performance Switching and Routing, Piscataway, New Jersey, May 29-31, 2001, pp. 88-92.

* cited by examiner

*Primary Examiner* — Leslie Pascal
(74) *Attorney, Agent, or Firm* — Seed IP Law Group PLLC (57) ABSTRACT

An on-chip receiver for flows of information conveyed to a target via optical signals with different wavelengths includes a plurality of photo-detector modules, each sensitive to a different wavelength, for converting a respective optical signal at input into an electrical signal, a plurality of de-serialization circuits acting on the electrical signals for converting into packet traffic the flows of information received via the photo-detector modules, and an arbitration node acting on the packet traffic to enable a single packet at a time to achieve the target.

45 Claims, 6 Drawing Sheets

OPTICAL RECEIVER

BACKGROUND

1. Technical Field

The disclosure relates to optical receivers and has been developed with particular attention paid to its possible application to micro-architectures of optical receivers used in networks that exploit optical interconnections for connection between Intellectual Property (IP) cores.

2. Description of the Related Art

The techniques for producing optical transmitters and receivers form the subject of an extensive scientific and technical literature, also of a patent type.

BRIEF SUMMARY

Current literature does not appear to be aimed appreciably at micro-architectures for optical receivers that can be used both in systems-on-chip and in systems-off-chip. In view of what has been illustrated previously, there emerges the need to have available a type of optical receiver that can be used indifferently both in on-chip applications and in off-chip ones.

The object of an embodiment of the disclosure is to provide such a receiver.

In one embodiment, a receiver is responsible for detection of the traffic requests coming from the optical network, regardless of whether it is a network-on-chip or a network-off-chip. The receiver detects information in the form of light, and after appropriate conversions, i.e., transduction of the light into an electrical signal, conversion from current to voltage, adaptation of the level of the signal, de-serialization, decoding, and storage or buffering, the electrical information generated is sent to the electronic circuit selected as target.

In one embodiment, the receiver is used in an optical network of a CMOS-compatible type, where the network is based upon the wavelength-division multiplexing (WDM) technique.

A typical off-chip application is represented by die-to-die communication (System-in-Package) or by package-to-package communication (System-on-Board).

In an embodiment, a receiver comprises: a plurality of photo-detectors modules, each sensitive to a different wavelength and configured to convert a respective optical signal in input into an electric signal; a plurality of de-serialization circuits configured to convert said electrical signals into packet traffic information flows received through the photo-detectors modules; and an arbitrator configured to receive the packet traffic and select a single packet at a time to output to a target. In an embodiment, the receiver includes a plurality of buffer registers to store the packets of said packet traffic provided to the arbitrator. In an embodiment, said buffer registers are configured to transmit an electrical feedback signal when fully filled, so as to stop sending requests to the target. In an embodiment, the plurality of photo detector modules includes: a plurality of photo-detectors each sensitive to a different wavelength, configured to convert a respective optical signal in input into an electric current; and a plurality of current-voltage converters configured to transform the currents generated by said photo-detectors into electrical voltage signals. In an embodiment, the plurality of photo detector modules further includes a plurality of comparators configured to adjust levels of said voltage signals to levels manageable by said de-serialization circuits. In an embodiment, the receiver further comprises a plurality of optical bus inverters configured to perform a source decoding on packets of said packet traffic. In an embodiment, each of said optical bus inverters includes an inversion module configured to invert a signal received at input based on a control signal and an inversion algorithm. In an embodiment, each of said optical bus inverters is configured to encrypt an entire packet by reversing all bits that make the packet. In an embodiment, each of said optical bus inverters is configured to encrypt only a portion of a packet reversing bits starting from a selected bit. In an embodiment, the arbitrator has a pipelined structure comprising: an input buffer module configured to store incoming packets; an arbitration module configured to select the packets to be sent to the target; a decision node controlled by said arbitration module configured to pass the selected packet; and an output buffer configured to deliver in output clean signals to ensure a continuous flow when a target interface is available. In an embodiment, said output buffer is configured to send a permission signal to said arbitration module so that the arbitration process takes place only if there are available positions in input buffers in the input buffer module associated with the target. In an embodiment, the arbitrator comprises a set of memory-mapped registers configurable via software through a specific programming port and the arbitrator is configured to work according to a variety of arbitration schemes selected out of: defined priority; priority based on an order of arrival of requests; variable priority based on bandwidth; and variable priority based on latency. In an embodiment, said receiver is a system on-chip. In an embodiment, said optical signals are produced by on-chip and off-chip sources.

In an embodiment, a system comprises: a transmitter configured to transmit a plurality of optical signals at respective wavelengths; and a receiver, comprising: means for converting the plurality of optical signals into respective electrical signals; means for converting the electrical signals into respective packet traffic information flows; and means for selecting a single packet at a time from the packet traffic information flows to output to a target. In an embodiment, the receiver further comprises means for storing packets of said packet traffic provided to the means for selecting. In an embodiment, the means for converting the plurality of optical signals comprises: a plurality of photo-detectors each sensitive to a different wavelength, configured to convert a respective optical signal in input into an electric current; and a plurality of current-voltage converters configured to transform the currents generated by said photo-detectors into electrical voltage signals. In an embodiment, the means for converting the plurality of optical signals further comprises a plurality of comparators configured to adjust levels of said voltage signals to levels manageable by said de-serialization circuits. In an embodiment, the receiver further comprises means for source decoding packets of said packet traffic. In an embodiment, the means for selecting has a pipelined structure comprising: an input buffer module configured to store incoming packets; an arbitration module configured to select the packets to be sent to the target; a decision node controlled by said arbitration module configured to pass the selected packed; and an output buffer configured to deliver in output clean signals to ensure a continuous flow when a target interface is available.

In an embodiment, a system comprises: a transmitter configured to transmit a plurality of optical signals at respective wavelengths; and a receiver, comprising: a plurality of photo-detectors modules, each sensitive to a different wavelength and configured to convert a respective optical signal in input into an electric signal; a plurality of de-serialization circuits configured to convert said electrical signals into packet traffic information flows received through the photo-detectors modules; and an arbitrator configured to receive the packet traffic and select a single packet at a time to output to a target. In an embodiment, the receiver includes a plurality of buffer registers to store the packets of said packet traffic provided to the arbitrator and said buffer registers are configured to transmit an electrical feedback signal when fully filled. In an embodiment, the plurality of photo detector modules includes: a plurality of photo-detectors each sensitive to a different wavelength, configured to convert a respective optical signal in input into an electric current; and a plurality of current-voltage converters configured to transform the currents generated by said photo-detectors into electrical voltage signals. In an embodiment, the plurality of photo detector modules further includes a plurality of comparators configured to adjust levels of said voltage signals to levels manageable by said de-serialization circuits. In an embodiment, the receiver further comprises a plurality of optical bus inverters configured to perform a source decoding on packets of said packet traffic. In an embodiment, each of said optical bus inverters includes an inversion module configured to invert a signal received at input based on a control signal and an inversion algorithm. In an embodiment, the arbitrator has a pipelined structure comprising: an input buffer module configured to store incoming packets; an arbitration module configured to select the packets to be sent to the target; a decision node controlled by said arbitration module configured to pass the selected packet; and an output buffer configured to deliver in output clean signals to ensure a continuous flow when a target interface is available. In an embodiment, said output buffer is configured to send a permission signal to said arbitration module so that the arbitration process takes place only if there are available positions in input buffers in the input buffer module associated with the target. In an embodiment, the arbitrator comprises a set of memory-mapped registers configurable via software through a specific programming port and the arbitrator is configured to work according to a variety of arbitration schemes selected out of: defined priority; priority based on an order of arrival of requests; variable priority based on bandwidth; and variable priority based on latency. In an embodiment, the transmitter and the receiver are on a chip. In an embodiment, the optical signals input to the receiver include optical signals generated by the transmitter and optical signals received from off-chip sources.

In an embodiment, a method comprises: receiving a plurality of optical signals each having a different wavelength; converting the plurality of optical signals into respective electrical signals; converting the electrical signals into respective packet traffic information flows; and selecting a single packet at a time from the packet traffic information flows to output to a target. In an embodiment, the method further comprises storing packets of said packet traffic information flows in a buffer module and providing a feedback signal when the buffer module is full. In an embodiment, converting the plurality of optical signals into respective electrical signals includes: converting a respective optical signal in input into an electric current; transforming the currents generated into electrical voltage signals; and adjusting levels of said voltage signals to levels suitable for conversion into packet traffic information flows. In an embodiment, the method further comprises performing source decoding on packets of said packet traffic. In an embodiment, performing source decoding comprises inverting a signal received at input based on a control signal and an inversion algorithm. In an embodiment, the selecting comprises applying at least one arbitration scheme selected from the group consisting of: a defined priority scheme; a priority scheme based on an order of arrival of requests; a variable priority scheme based on bandwidth; and a variable priority scheme based on latency.

BRIEF DESCRIPTION OF THE SEVERAL VIEWS OF THE DRAWINGS

The disclosure will now be described, purely by way of non-limiting example, with reference to the annexed representations, wherein.

DETAILED DESCRIPTION

Illustrated in the ensuing description are various specific details aimed at an in-depth understanding of the illustrated embodiments. The embodiments can be provided without one or more of the specific details, or with other methods, components, materials, etc. In other cases, known structures, materials or operations are not illustrated or described in detail to prevent various aspects of the embodiments from being obscured.

Reference to "one embodiment" in the framework of this description is intended to indicate that a particular configuration, structure, or characteristic described in relation to the embodiment is comprised in at least one embodiment. Hence, phrases such as "in one embodiment", which may be present in different points of this description, do not necessarily refer to one and the same embodiment. Furthermore, particular conformations, structures or characteristics can be combined in an adequate way in one or more embodiments.

The references used herein are only for convenience and hence do not define the sphere of protection or the scope of the embodiments.

A typical on-chip application is represented by networks-on-chip (NoCs) that exploit optical connections based upon wavelength-division-multiplexing (WDM) techniques for the physical layer.

The description relates to embodiments of the micro-architecture of a receiver of optical information that can be used both in networks-on-chip and in networks-off-chip.

Figure 1:
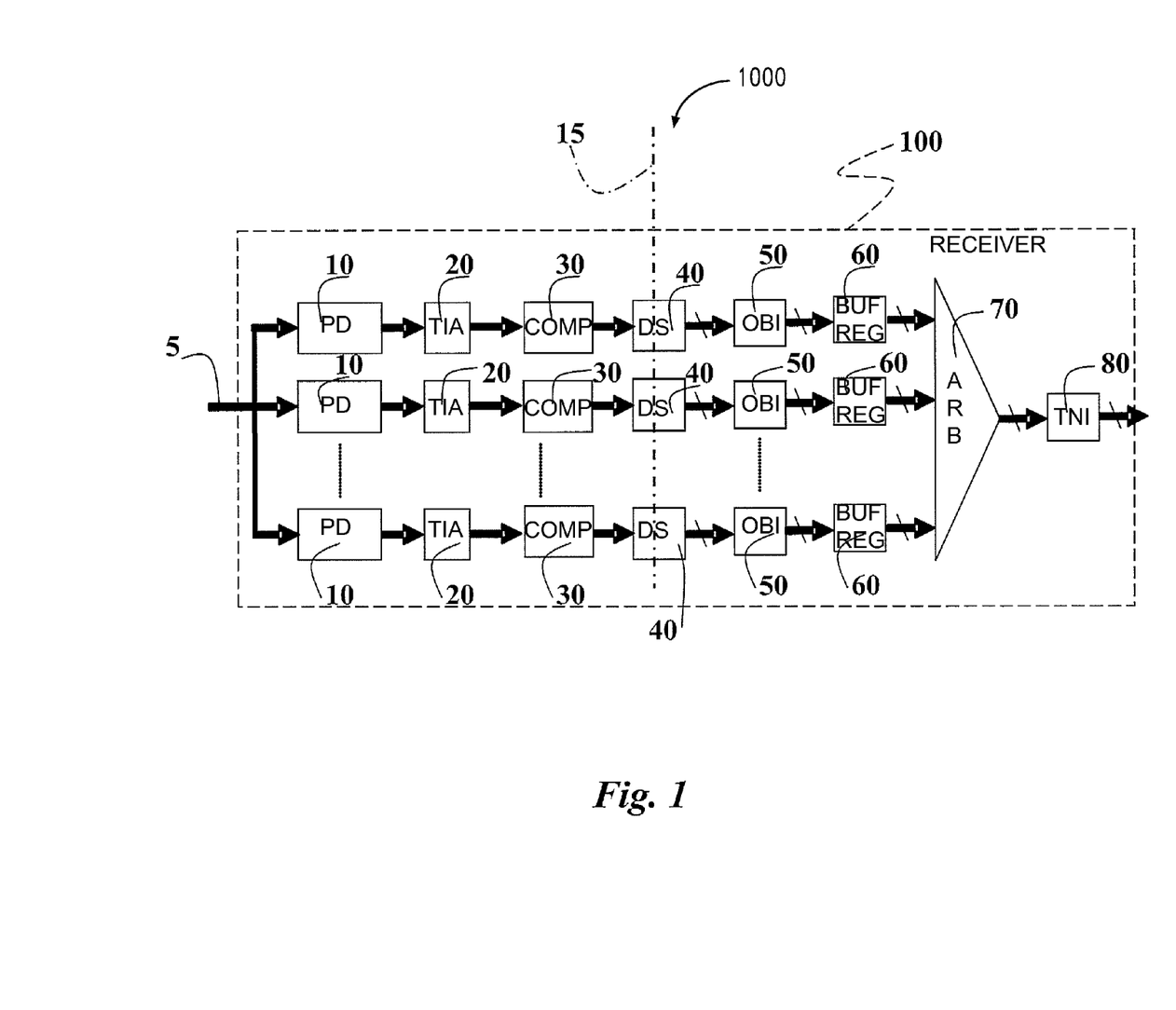
FIG. 1 shows an example embodiment of a micro-architecture of an optical receiver.

FIG. 1 shows an example of embodiment of the micro-architecture of a receiver 100 in an embodiment of a system 1000. It is possible to distinguish the following elements in the illustrated embodiment:

a plurality of photo-detectors 10;
a plurality of trans-impedance amplifiers (TIAs) 20, which work as current-voltage converters;
a plurality of level comparators or adaptors 30;
a plurality of de-serialization modules 40;
a plurality of reception Optical Bus Inverters (OBIs) 50;
a plurality of buffer registers 60;
an arbitration node 70 with N inputs and one output; and
a reception target network interface (TNI) 80.

With reference to FIG. 1, the optical signals reach the photo-detectors 10 through an optical waveguide designated by the reference number 5. The detectors 10 form the opto-electronic portion of the receiver circuit 100.

Present in FIG. 1 are modules that are purely digital and others that are purely analog.

In particular, in the embodiment illustrated in FIG. 1, the analog modules are represented by trans-impedance amplifiers 20 and by level comparators or adaptors 30.

The trans-impedance amplifiers 20 are used for generating an analog voltage signal starting from the current absorbed by the photo-detectors 10 present in the photonic layer, whilst the level comparators or adaptors 30 are responsible for generation of voltage levels compatible with the CMOS technology of the chips that form the network.

The remaining modules of FIG. 1 are digital modules and can be implemented as RTL-synthesizable modules (RTL: Register Transfer Level), for example through VHDL or Verilog. On account of the constraints of high rate of the optical domain, for some of them, in particular for the de-serialization modules 40, recourse may be had to the implementation at a transistor level to meet any stringent requirements that may be imposed in an embodiment.

Hereinafter the functions of the main modules present in an embodiment of a receiver of FIG. 1 will be described in detail.

Each photo-detector 10 functions as optical sensor capable of recognizing a signal with a given wavelength present on the waveguide 5 and of converting this optical signal into an electrical current signal. Each photo-detector is sensitive to a different wavelength, thus rendering the wavelength-division-multiplexing (WDM) technique applicable. In this way, different sources transmit information using signals with different wavelengths and the simultaneous transmissions of different sources can coexist on one and the same transmission channel.

In the example of embodiment considered here, each trans-impedance amplifier 20 has the task of generating a voltage of some millivolts on the basis of the current of some milliamps generated by the corresponding photo-detector 10 present in the photonic layer, and basically is configured as a current-to-voltage converter.

The role of the comparators 30 is to adapt the voltage level at output from the amplifiers 20 to a higher voltage level similar to the one used within the CMOS electronic circuit. The operating voltage level of an electronic circuit depends upon the CMOS technology used for production of the circuit itself.

In FIG. 1, the line 15 delimits the frequency domain of the optical network (modules 10, 20, 30) from the frequency domain of the target (modules 50, 60, 70, 80). In particular, the de-serialization module 40 acts as conversion module between the two frequencies. Typically, the two domains may work with clocks with different frequencies.

In the ensuing figures, parts, elements, or components that are identical or equivalent to parts, elements, or components already described with reference to FIG. 1 are designated by the same references, thus rendering any repetition of the corresponding description superfluous.

Figure 2:
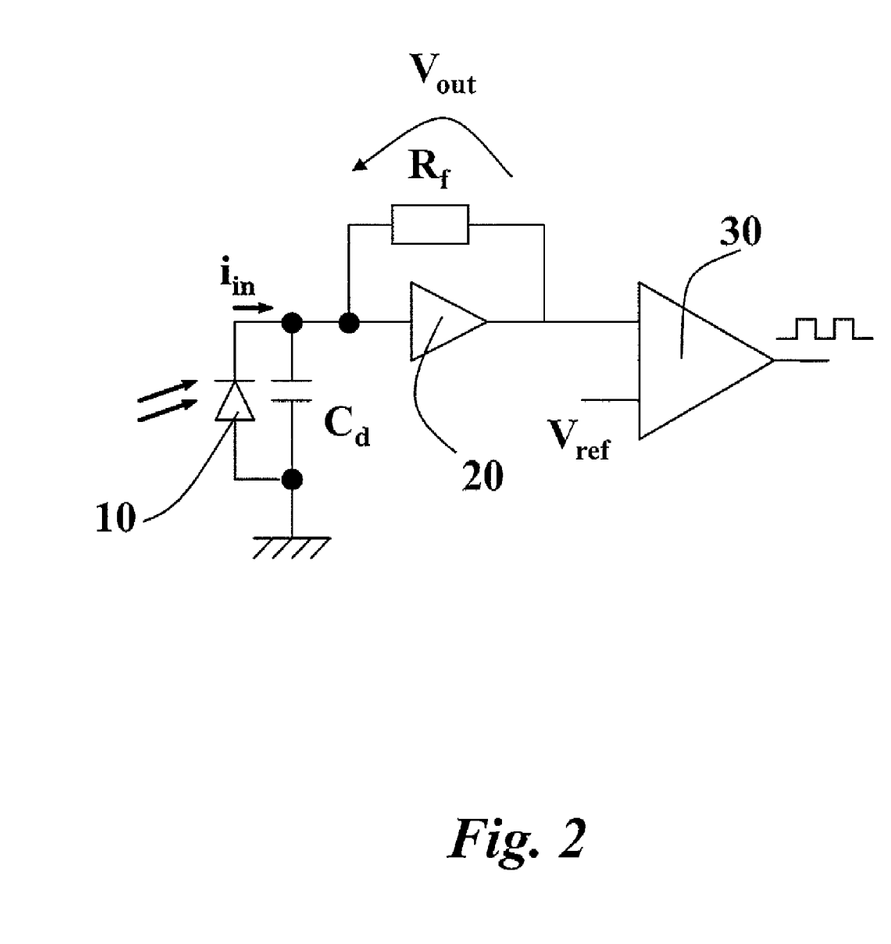
FIG. 2 shows an embodiment of the comparator module of the circuit receiver of FIG. 1.

With reference to FIG. 2, the photo-detector is provided via a photo-diode 10 to which a capacitor $C_d$ is connected in parallel. The photo-diode 10 generates a current $i_{in}$ that is sent at input to the amplifier 20, which, through the resistance $R_f$, converts it into a voltage $V_{out}$. The output voltage $V_{out}$ is compared by the comparator 30 with a reference voltage $V_{ref}$ for generating a corresponding voltage signal suitable for being used by the subsequent modules.

The de-serialization module 40 has the task of converting the serial flow of bits received into the typical packet traffic expected by the network interface of a target. In particular, there is the division into header and payload packets transmitted as flit (flow control unit) entities. The dimension of each packet is defined on the basis of the width of the physical channel (36|72|144 bits). The de-serialization operation hence has the purpose of regenerating, receiver side, the original data transmitted, transmitter side.

Given the high rate at which the data are typically transmitted in the optical domain, the input of the serialization module in the transmitter works at a very high frequency, and for this reason a purposely designed high-speed phase lock loop (PLL) is used in an embodiment.

Figure 4:
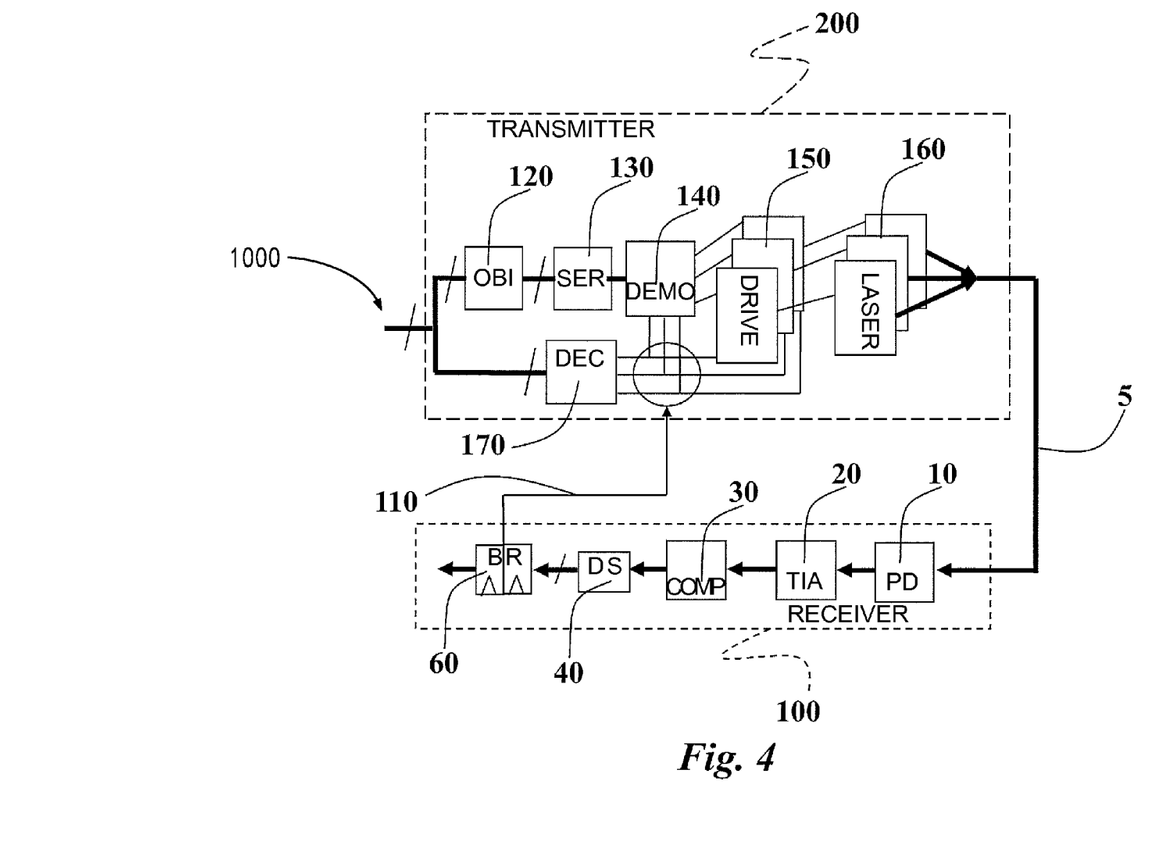
FIG. 4 shows an embodiment in which an electrical feedback signal is present between the receiver and the transmitter.

The Optical-Bus-Inverter (OBI) receiver module 50 implements a source-decoding technique that enables recovery of the original number of bits at the high level, i.e., at level "1", within a packet after the source coding performed by the corresponding OBI transmitter module 120 (see FIG. 4). The coding is performed with the purpose of reducing to a minimum the optical energy used for transmission of the data. The coding strategy is selected so as to keep the laser 160, used as emitter, turned off as much as possible during transmission of the information.

An example of source coding is described in US 2005/0281562 A1, assigned to the present applicant. In particular, said document regards a method for reducing the number of logic 1's that have to be transmitted on an optical connection in order to reduce to a minimum the optical power transmitted, keeping the emitter turned off as long as possible.

Figure 3A:
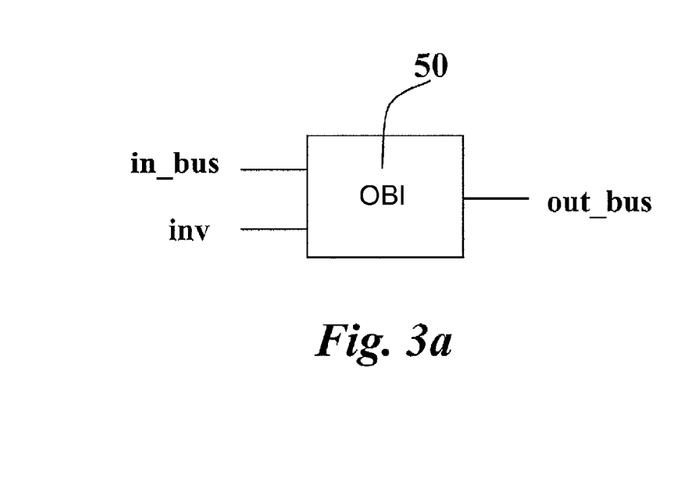
FIGS. 3a and 3b show an embodiment of the Optical-Bus-Inverter receiver module.
Figure 3B:
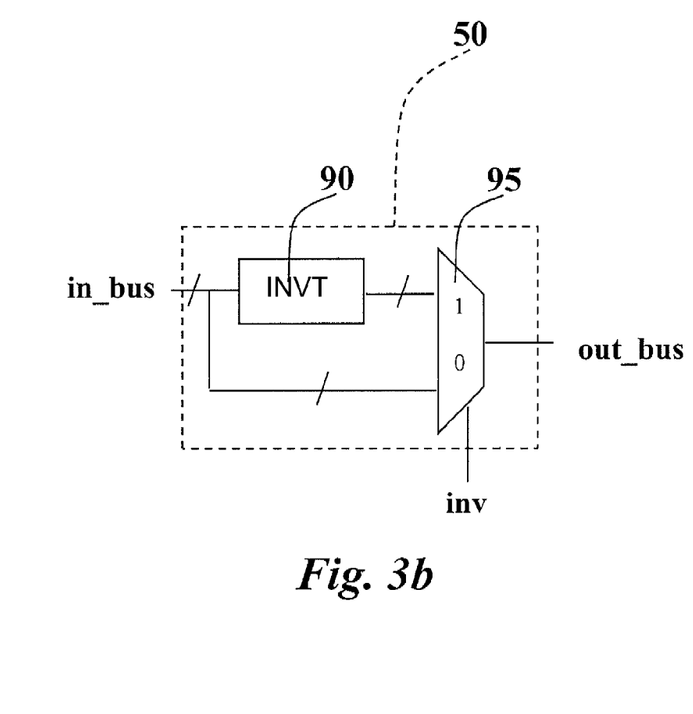

Operation of an embodiment of the OBI receiver module 50, according to the diagram illustrated in FIGS. 3a and 3b, is described in what follows:

the signal in_bus received at input is inverted by an appropriate inversion module 90 using the same inversion algorithm used for coding by the OBI transmitter module 120;

the output signal out_bus from the module 95 varies according to the value of the inversion signal inv: if the signal inv is at the low level "0" the incoming signal is propagated unvaried, whereas, if the signal inv is at the high level "1", the inverted signal is transmitted.

In particular, coding can regard the entire packet, i.e., all the bits that make it up are inverted, or else there may be intermediate solutions in which the packet is inverted only from a certain starting bit onwards. For further details on the techniques of source coding/decoding reference may be made to US 2005/0281562 A1.

Table 1 below shows some examples of decoding on optical buses, corresponding to an 8-bit bus.

TABLE 1

| Value on the BUS | Signal inv | Decoding |
|---|---|---|
| 00000000 | 0 | 00000000 |
| 10000000 | 1 | 11111111 |
| 10010010 | 0 | 10010010 |
| 10100010 | 1 | 11011101 |
| 00010100 | 1 | 00011011 |
| 00001000 | 1 | 00001111 |
| 01010101 | 0 | 01010101 |
| 10101010 | 0 | 10101010 |
| 10000001 | 1 | 11111110 |

The buffer 60 is an element of buffer memory present in the receiver 100 that is responsible for conservation of the flits sent by the initiator that, on account of the low priority associated thereto, are penalized in the arbitration process. When a buffer 60 fills up completely it transmits an electrical feedback signal 110 to the initiator of the transmitter 200 so as to interrupt sending of requests to the receiver 100 in order to prevent any loss of information on account of the lack of archive space available.

An embodiment of a mechanism of feedback between the receiver 100 and the transmitter 200 of a system 1000 is illustrated in FIG. 4.

The transmitter 200 comprises, in a dual way with respect to the receiver, an OBI transmitter module 120 to which a serialization module 130 is connected. The module 170 is a decoder r_src, the outputs of which are connected to a demodulator module 140 and to a plurality of driver modules 150. The demodulator 140 receives at input the data serialized by the module 130 and the outputs of the decoding module 170. In turn, the outputs of the demodulator 140 are connected to the driver modules 150 that are configured to drive the laser modules 160 that form the emitters. Copending U.S. application Ser. No. 12/790,662, filed by Alberto Scandurra, et al., on the same day as the present application, May 28, 2010, and entitled "Optical Transmitter," and which also claims priority to Italian Application Nos. TO2009A000472 and TO2009A000473, discloses embodiments of example transmitters suitable for use in the embodiment of FIG. 4.

To return to the receiver of FIG. 1, the arbitration node 70 has the task of ordering the requests arriving simultaneously from different buffers of the initiators so as to enable a single source to reach the target network interface 80. The node 70 is hence used for controlling the traffic flow.

In the arbitration process, a simple fixed priority scheme may be adopted; namely, the buffer 60 corresponding to the target that has the highest priority prevails in the arbitration process and is authorized to propagate its flit to the target; the buffers 60 corresponding to the targets that have lost out in the arbitration process must wait, keeping the flit stored inside them.

Figure 5:
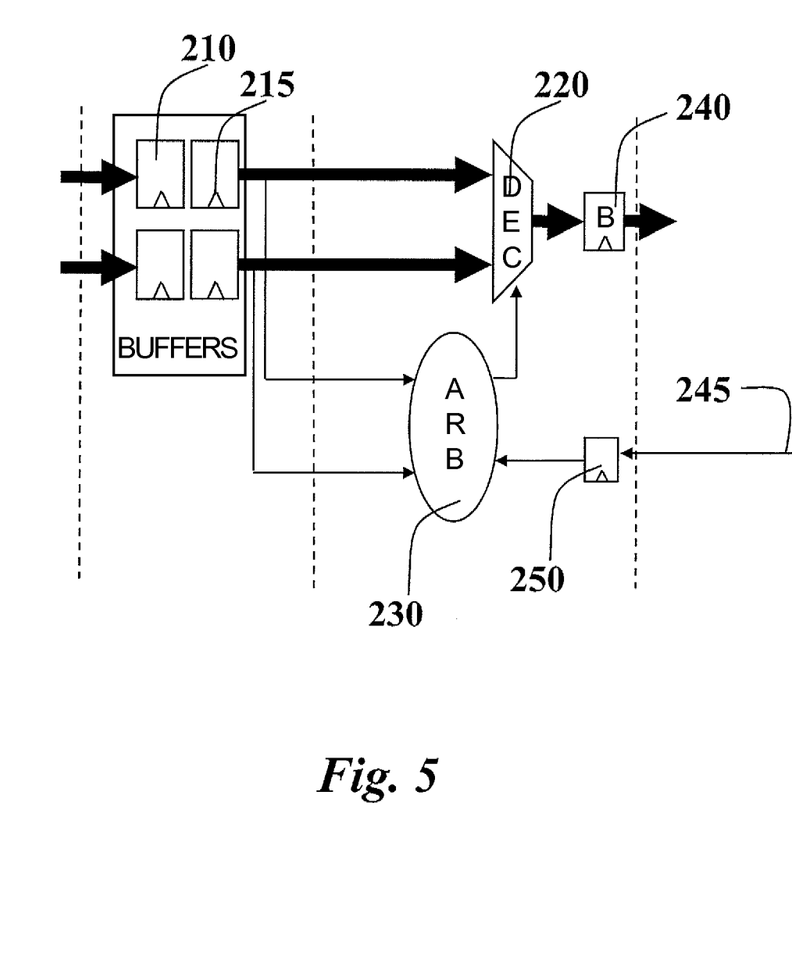
FIG. 5 shows an example embodiment of a receiver node with micro-architecture of a "pipelined" type.

FIG. 5 shows a micro-architecture of the optical receiver based upon the pipeline structure in the case of two sources that attempt to access a single interface 80 of the target.

The micro-architecture of the receiver node is based upon the pipeline structure of the response path of the VSTNoC node, which is made up of two pipeline steps, and the function of which is described in what follows:

step 1 (buffer input) envisages the use of a buffer with two positions 210, 215 for the flits, and has the task of storing the incoming flits, guaranteeing a continuous flow in the case where the corresponding buffer of the target wins out in the arbitration process and the interface of the target is available for accepting new requests; in the case of the optical receiver, this task is performed by a buffer of the external target; and step 2 (arbitration and output buffer) envisages the use of: an arbitration module 230 responsible for deciding which buffer can transfer its response flit and with governing the decider node 220 in order to get the selected flit to pass; and an output buffer 240 with two positions, having the task of providing at output clean signals to guarantee a continuous flow when the interface of the target is available.

The output buffer 240 supplies by default an enabling signal "ack" 245 to the arbitration module 230 so that the arbitration process will take place only if there are positions available in the buffer associated to the target requested in order to prevent assignment to the arbitration module 230 of a transaction that cannot be performed. The enabling signal 245 may be provided to the arbitration module 230 through a buffer 250.

The arbitration module 230 can present a variety of arbitration schemes configurable via software through a specific programming port and a set of memory-mapped registers. Given hereinafter are some examples of possible arbitration schemes.

Priority: each initiator is characterized by a priority value stored in the priority register present in the programming module of the receiver: the greater the value, the higher the priority.

LRA (Less Recently Arrived): the priority is assigned to the initiators in a dynamic way, according to the rule that the initiator that makes its request active first has a higher priority than an initiator that makes its request active after. The LRA mechanism may also be used by default to settle conflict when more than one initiator having equal priority emit the requests simultaneously. To have an arbitration scheme of an LRA type that is operative by default it is sufficient to program all the initiators with an equal priority value.

Control of the bandwidth: the priority is occasionally and temporarily reduced when a well-defined number of flits has been transmitted within a given period of time (frame) in order to limit the bandwidth consumed by an initiator within the frame.

Control of latency: the priority is occasionally and temporarily increased when an initiator has been awaiting the confirmation signal ack 245 for a given period of time (latency).

The programming logic of the receiver 100 contains registers, the contents of which determine how the arbitration process is performed.

In an embodiment, the micro-architecture based upon the pipeline gets the receiver node to work at a minimum frequency of 500 MHz, with a maximum frequency envisaged of 750 MHz, in the case of a 45-nm CMOS technology and in the case of more modern technologies.

The network interface module 80 of the target is configured to convert the information into the specific format for the target (STBus, AMBA AXI, OCP). In particular, the module 80 carries out protocol conversion.

The embodiment described herein enables management of the information transmitted in the form of light on an optical network, both in systems-on-chip and in systems-off-chip (such as the Multi-chip-Modules or the System-on-Board).

The optical connection enables extensive exploitation of the properties of light, namely a wider bandwidth, immunity to noise and interference, WDM capacity, absence of problems of routing and/or congestion in the physical layer.

Figure 6:
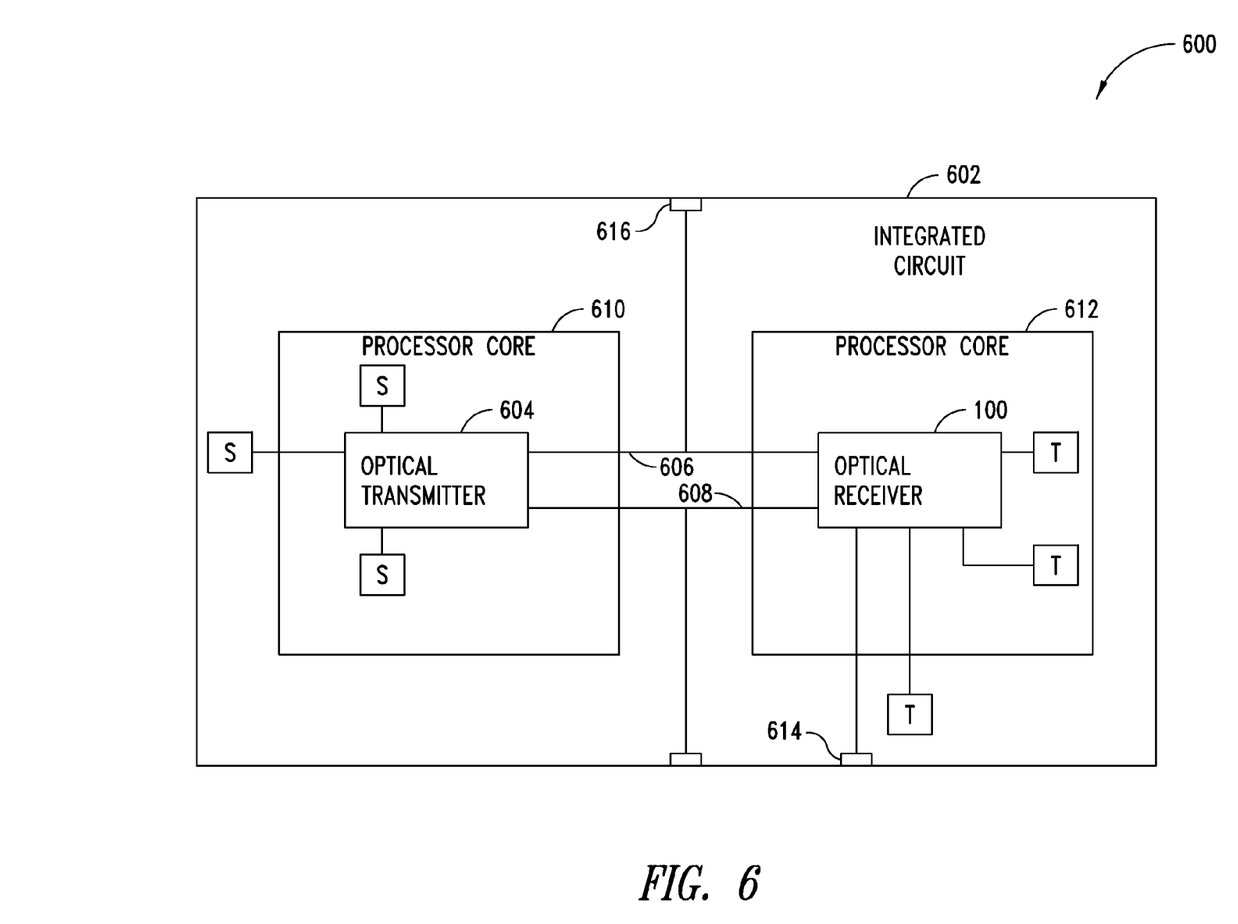
FIG. 6 shows an embodiment of a system including an embodiment of an optical transmitter and an optical receiver.

FIG. 6 illustrates an embodiment of a system 600 comprising a integrated circuit chip 602 having an embodiment of an optical transmitter 604 and an optical receiver 100 coupled together by an optical bus 606, such as a waveguide, and by an electrical bus 608. As illustrated, the transmitter 604 is part of a first processing core 610 and the receiver 100 is part of a second processing core 612. Copending U.S. application Ser. No. 12/790,662, filed by Alberto Scandurra, et al., on the same day as the present application, May 28, 2010, and entitled "Optical Transmitter," and which also claims priority to Italian Application Nos. TO2009A000472 and TO2009A000473, discloses embodiments of example transmitters suitable for use in the embodiment of FIG. 6. As illustrated, the optical receiver 100 is coupled to a plurality of targets T, some of which are part of the second processor core 612 and some of which are not part of the second processor core 612. The optical receiver 100 may also couple to an off-chip target, for example through a node 614. The optical receiver 100 may also be coupled to off-chip optical signal sources, for example through the waveguide 606 and a node 616.

The use of an optical connection can be easily identified in the case of an on-board off-chip communication, whereas, in the case of SoCs or SiPs, even "opening" the package of the receiver may not allow a viewer to glean anything as regards the micro-architecture of the optical receiver.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

Without prejudice to the principle of the embodiments of the disclosure, the details of construction and the embodiments may hence vary, even considerably, with respect to what is illustrated herein purely by way of example, without thereby departing from the scope of the disclosure, as defined by the annexed claims.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A receiver, comprising:
a plurality of photo-detectors modules, each sensitive to a different wavelength and configured to convert a respective optical signal in input into an electric signal;
a plurality of de-serialization circuits configured to convert said electrical signals into packet traffic information flows received through the photo-detectors modules;
an arbitrator configured to receive the packet traffic and select a single packet at a time to output to a target; and
a plurality of buffer registers to store the packets of said packet traffic provided to the arbitrator, wherein said buffer registers are configured to transmit an electrical feedback signal when fully filled, so as to stop sending requests to the target.

2. The receiver of claim 1 wherein said receiver is a system on-chip.

3. The receiver of claim 1 wherein said optical signals are produced by on-chip and off-chip sources.

4. A receiver, comprising:
a plurality of photo-detectors modules, each sensitive to a different wavelength and configured to convert a respective optical signal in input into an electric signal;
a plurality of de-serialization circuits configured to convert said electrical signals into packet traffic information flows received through the photo-detectors modules; and
an arbitrator configured to receive the packet traffic and select a single packet at a time to output to a target, wherein the plurality of photo detector modules includes:
a plurality of photo-detectors each sensitive to a different wavelength, configured to convert a respective optical signal in input into an electric current; and
a plurality of current-voltage converters configured to transform the currents generated by said photo-detectors into electrical voltage signals.

5. The receiver of claim 4 wherein the plurality of photo detector modules further includes a plurality of comparators configured to adjust levels of said voltage signals to levels manageable by said de-serialization circuits.

6. The receiver of claim 4, further comprising a plurality of optical bus inverters configured to perform a source decoding on packets of said packet traffic.

7. The receiver of claim 4 wherein the arbitrator has a pipelined structure comprising:
an input buffer module configured to store incoming packets;
an arbitration module configured to select the packets to be sent to the target;
a decision node controlled by said arbitration module configured to pass the selected packet; and
an output buffer configured to deliver in output clean signals to ensure a continuous flow when a target interface is available.

8. A receiver, comprising:
a plurality of photo-detectors modules, each sensitive to a different wavelength and configured to convert a respective optical signal in input into an electric signal;
a plurality of de-serialization circuits configured to convert said electric signals into packet traffic information flows received through the photo-detectors modules;
an arbitrator configured to receive the packet traffic and select a single packet at a time to output to a target; and
a plurality of optical bus inverters configured to perform a source decoding on packets of said packet traffic.

9. The receiver of claim 8, including a plurality of buffer registers to store the packets of said packet traffic provided to the arbitrator.

10. The receiver of claim 9, in which said buffer registers are configured to transmit an electrical feedback signal when fully filled, so as to stop sending requests to the target.

11. The receiver of claim 8 wherein each of said optical bus inverters includes an inversion module configured to invert a signal received at input based on a control signal and an inversion algorithm.

12. The receiver of claim 8 wherein each of said optical bus inverters is configured to encrypt an entire packet by reversing all bits that make the packet.

13. The receiver of claim 8 wherein each of said optical bus inverters is configured to encrypt only a portion of a packet reversing bits starting from a selected bit.

14. A receiver, comprising:
a plurality of photo-detectors modules, each sensitive to a different wavelength and configured to convert a respective optical signal in input an electric signal;
a plurality of de-serialization circuits configured to convert said electrical signals into packet traffic information flows received through the photo-detectors modules; and
an arbitrator configured t receive the packet traffic and select a single packet at a time to output to a target, wherein the arbitrator has a pipelined structure comprising:
an input buffer module configured to store incoming packets;
an arbitration module configured to select the packets to be sent to the target;
a decision node controlled by said arbitration module configured to pass the selected packet; and
an output buffer configured to deliver in output clean signals to ensure a continuous flow when a target interface is available.

15. The receiver of claim 14, wherein said output buffer is configured to send a permission signal to said arbitration module so that the arbitration process takes place only if there are available positions in input buffers in the input buffer module associated with the target.

16. The receiver of claim 14 wherein the arbitrator comprises a set of memory-mapped registers configurable via software through a specific programming port and the arbitrator is configured to work according to a variety of arbitration schemes selected out of:
defined priority;
priority based on an order of arrival of requests;
variable priority based on bandwidth; and
variable priority based on latency.

17. A receiver comprising:
a plurality of photo-detectors modules, each sensitive to a different wavelength and configured to convert a respective optical signal in input into an electric signal;
a plurality of de-serialization circuits configured to convert said electrical signals into packet traffic information flows received through the photo-detectors modules; and
an arbitrator configured to receive the packet traffic and select a single packet at a time to output to target, the arbitrator including a set of memory-mapped registers configurable via software through a specific programming port and the arbitrator is configured to work according to at least one of a plurality of arbitration schemes selected out of:
defined priority;
priority based on an order of arrival of requests;
variable priority based on bandwidth; and
variable priority based on latency.

18. The receiver of claim 17 wherein the plurality of photo detector modules includes:
a plurality of photo-detectors each sensitive to a different wavelength, configured to convert a respective optical signal in input into an electric current; and
a plurality of current-voltage converters configured to transform the currents generated by said photo-detectors into electrical voltage signals.

19. The receiver of claim 17, comprising a plurality of optical bus inverters configured to perform a source decoding on packets of said packet traffic.

20. A system, comprising:
a transmitter configured to transmit a plurality of optical signals at respective wavelengths; and
a receiver, comprising:
an optical converter configured to convert the plurality of optical signals into respective electrical signals;
means for converting the electrical signals into respective packet traffic information flows; and
means for selecting a single packet at a time from the packet traffic information flows to output to a target, wherein the optical converter includes;
a plurality of photo-detectors each sensitive to a different wavelength, configured to convert a respective optical signal input into an electric current; and
a plurality a current-voltage converters configured to transform the currents generated by said photo-detectors into electrical voltage signals.

21. The system of claim 20 wherein the receiver further comprises means for storing packets of said packet traffic provided to the means for selecting.

22. The system of claim 20 wherein the optical converter comprises a plurality of comparators configured to adjust levels of said voltage signals to levels manageable by said de-serialization circuits.

23. The system of claim 20 wherein the receiver further comprises means for source decoding packets of said packet traffic.

24. A system, comprising:
a transmitter configured to transmit a plurality of optical signals at respective wavelengths; and
a receiver, comprising:
means for converting the plurality of optical signals into respective electrical signal;
means for converting the electrical signals into respective packet traffic information flows; and
a arbitrator configured to select a single packet at a time from the packet traffic information flows to output to a target, the arbitrator having a pipelined structure comprising:
an input buffer module configured to store incoming packets;
an arbitration module configured to select the packets to be sent to the target;
a decision node controlled by said arbitration module configured to pass the selected packed; and
an output buffer configured to deliver in output clean signals to ensure a continuous flow when a target interface is available.

25. The system of claim 24 wherein the receiver further comprises means for source decoding packets of said packet traffic.

26. The system of claim 24 wherein the means for converting the plurality of optical signals comprises:
a plurality of photo-detectors each sensitive to a different wavelength, configured to convert a respective optical signal in input into an electric current; and
a plurality of current-voltage converters configured to transform the currents generated by said photo-detectors into electrical voltage signals.

27. A system, comprising:
a transmitter configured to transmit a plurality of optical signals at respective wavelengths; and
a receiver, comprising:
a plurality of photo-detectors modules, each sensitive to a different wavelength and configured to convert a respective optical signal in input into an electric signal, wherein the plurality of photo detector modules includes:
a plurality of photo-detectors each sensitive to a different wavelength, configured to convert a respective optical signal in input into an electric current; and
a plurality of current-voltage converters configured to transform the current generated by said photo-detectors into electrical voltage signals;
a plurality of de-serialization circuits configured to convert said electrical signals into packet traffic information flows received through the photo-detectors modules; and
an arbitrator configured to receive the packet traffic and select a single packet at a time to output to a target.

28. The system of claim 27 wherein the receiver includes a plurality of buffer registers to store the packets of said packet traffic provided to the arbitrator and said buffer registers are configured to transmit an electrical feedback signal when fully filled.

29. The system of claim 27 wherein the transmitter and the receiver are on a chip.

30. The system of claim 29 wherein the optical signals input to the receiver include optical signals generated by the transmitter and optical signals received from off-chip sources.

31. A system, comprising:
a transmitter configured to transmit a plurality of optical signals at respective wavelengths; and
a receiver, comprising:
a plurality of photo-detectors modules, each sensitive to a different wavelength and configured to convert a respective optical signal in input an electric signal;
a plurality of de-serialization circuits configured to convert said electrical signals into packet traffic information flows received through the photo-detectors modules;
an arbitrator configured to receive the packet traffic and select a single packet at a time to output to a target; and
plurality of optical bus inverters configured to perform a source decoding on packets of said packet traffic.

32. The system of claim 31 wherein the plurality of photo detector modules includes:
a plurality of photo-detectors each sensitive to a different wavelength, configured to convert a respective optical signal in input into an electric current; and
a plurality of current-voltage converters configured to transform the currents generated by said photo-detectors into electrical voltage signals.

33. The system of claim 32 wherein the plurality of photo detector modules further includes a plurality of comparators configured to adjust levels of said voltage signals to levels manageable by said de-serialization circuits.

34. The system of claim 31 wherein each of said optical bus inverters includes an inversion module configured to invert a signal received at input based on a control signal and an inversion algorithm.

35. A system, comprising:
a transmitter configured to transmit a plurality of optical signals at respective wavelengths; and
a receiver, comprising:
a plurality of photo-detectors modules, each sensitive to a different wavelength and configured to convert a respective optical signal in input into an electric signal;
a plurality of de-serialization circuits configured to convert said electrical signals into packet traffic information flows received through the photo-detectors modules; and
an arbitrator configured to receive the packet traffic and select a single packet at a time to output to a target, the arbitrator having a pipelined structure including:
an input buffer module configured to store incoming packets;
an arbitration module configured to select the packets to be sent to the target;
a decision node controlled by said arbitration module configured to pass the selected packet; and
an output buffer configured to deliver in output clean signals to ensure a continuous flow when a target interface is available.

36. The system of claim 35 wherein said output buffer is configured to send a permission signal to said arbitration module so that the arbitration process takes place only if there are available positions in input buffers in the input buffer module associated with the target.

37. A system, comprising:
a transmitter configured to transmit a plurality of optical signals at respective wavelengths; and
a receiver, comprising:
a plurality of photo-detectors modules, each sensitive to a different wavelength and configured to convert a respective optical signal in input an electric signal;
a plurality of de-serialization circuits configured to convert said electrical signals into packet traffic information flows received through the photo-detectors modules; and
a arbitrator configured to receive the packet traffic and select a single packet at a time to output to a target, the arbitrator including a set of memory-mapped registers configurable via software through a specific programming port and the arbitrator is configured to work according to a plurality of arbitration schemes selected out of:
defined priority;
priority based on an order of arrival of requests;
variable priority based on bandwidth; and
variable priority based on latency.

38. A method comprising:
receiving a plurality of optical signals each having a different wavelength;
converting the plurality of optical signals into respective electrical signals;
converting the electrical signals into respective packet traffic information flows; and
selecting a single packet at a time from the packet traffic information flows to output to a target, wherein converting the plurality of optical signals into respective electrical signals includes;
converting a respective optical signal in input into an electric current;
transforming the currents generated into electrical voltage signals; and
adjusting levels of said voltage signals to levels suitable for conversion into packet traffic information flows.

39. The method of claim 38, further comprising storing the packets of said packet traffic information flows in a buffer module and providing a feedback signal when the buffer module is full.

40. The method of claim 38, further comprising performing source decoding on packets of said packet traffic.

41. A method comprising:
 receiving a plurality of optical signals each having a different wavelength;
 converting the plurality of optical signals into respective electrical signals;
 converting the electrical signals into respective packet traffic information flows;
 selecting a single packet at a time from the packet traffic information flows to output to a target; and
 performing source decoding by inverting a signal received at input based on a control signal and an inversion algorithm.

42. The method of claim 41 wherein converting the plurality of optical signals into respective electrical signals includes:
 converting a respective optical signal in input into an electric current;
 transforming the currents generated into electrical voltage signals; and
 adjusting levels of said voltage signals to levels suitable for conversion into packet traffic information flows.

43. A method comprising:
 receiving a plurality of optical signals each having a different wavelength;
 converting the plurality of optical signals into respective electrical signals;
 converting the electrical signals into respective packet traffic information flows; and
 selecting a single packet at a time from the packet traffic information flows to output to a target, the selecting including applying at least one arbitration scheme selected from a group consisting of:
  a defined priority scheme
  a priority scheme based on an order of arrival of request;
  a variable priority scheme based on bandwidth; and
  a variable priority scheme based on latency.

44. The method of claim 43, wherein converting the plurality of optical signals into respective electrical signals includes:
 converting a respective optical signal in input into an electric current;
 transforming the currents generated into electrical voltage signals; and
 adjusting levels of said voltage signals to levels suitable for conversion into packet traffic information flows.

45. The method of claim 43 comprising performing source decoding by inverting a signal received at input based on a control signal and an inversion algorithm.

* * * * *